(12) United States Patent
Söderman et al.

(10) Patent No.: US 11,325,267 B2
(45) Date of Patent: May 10, 2022

(54) CONTROLLING A VACUUM SYSTEM COMPRISING A VACUUM GENERATOR ARRANGEMENT

(71) Applicant: PIAB Aktiebolag, Täby (SE)

(72) Inventors: Daniel Söderman, Vallentuna (SE); Simon Ahlin Högfeldt, Stockholm (SE); Gustaf Wigren, Vaxholm (SE)

(73) Assignee: PIAB Aktiebolag, Täby (SE)

( * ) Notice: Subject to any disclaimer, the term of this patent is extended or adjusted under 35 U.S.C. 154(b) by 287 days.

(21) Appl. No.: 16/684,663

(22) Filed: Nov. 15, 2019

(65) Prior Publication Data

US 2020/0171676 A1   Jun. 4, 2020

(30) Foreign Application Priority Data

Nov. 29, 2018  (EP) .................................... 18209229
Mar. 15, 2019  (EP) .................................... 19163224

(51) Int. Cl.
*B25J 15/06* (2006.01)
*B65G 61/00* (2006.01)

(52) U.S. Cl.
CPC .......... *B25J 15/0625* (2013.01); *B65G 61/00* (2013.01)

(58) Field of Classification Search
CPC ................. B25J 15/0625; B65G 61/00; B65G 2203/025; B65G 2203/0258; B65G 47/917; B66C 1/0268; B66C 1/0256; B66C 1/0237; B66C 1/0293; B66C 13/16; F04F 5/52
See application file for complete search history.

(56) References Cited

U.S. PATENT DOCUMENTS 7,677,622 B2 *   3/2010  Dunkmann ..........  B65G 47/917
                                                       294/65
2008/0247856 A1   10/2008  Schaumberger

FOREIGN PATENT DOCUMENTS

| CN | 107061376 B | * | 5/2020 | ........... B66C 1/0256 |
| CN | 107529504 B | * | 10/2020 | ........... G01M 3/184 |
| EP | 3 252 317 A1 | | 12/2017 | |
| JP | 2018021546 A | * | 2/2018 | .......... B25J 15/0625 |
| KR | 101618884 B1 | * | 5/2016 | ................ F04F 5/52 |

OTHER PUBLICATIONS

European Search Report for corresponding European Patent Application No. 19163224.9 dated Sep. 24, 2019.

* cited by examiner

*Primary Examiner* — Stephen A Vu
(74) *Attorney, Agent, or Firm* — Renner, Otto, Boisselle & Sklar, LLP

(57) ABSTRACT

A vacuum system (10) and method (100) used for creating a dynamically controlled vacuum system (10) for lifting processes (Wc) are disclosed. The compressed air used for an ejector (3) is varied by calculating the required vacuum levels (V⁻) during the lifting process (Wc). This reduces the air consumption.

14 Claims, 3 Drawing Sheets

CONTROLLING A VACUUM SYSTEM COMPRISING A VACUUM GENERATOR ARRANGEMENT

This application claims priority to European Patent Application No. 18 209 229.6 filed on Nov. 29, 2018 and European Patent Application No. 19 163 224.9 filed on Mar. 15, 2019, which are hereby incorporated herein by reference.

TECHNICAL FIELD

The present disclosure relates to a method of controlling and a system for a material handling system comprising a vacuum generator arrangement driven by compressed air in order to generate a negative pressure applicable for vacuum lifters.

BACKGROUND

The present invention relates generally to material handling systems having one or more vacuum lifters and, more particularly, to controlling such a vacuum system. It is known to provide a material handling system that includes a vacuum system having vacuum lifters such as suction cups or the like that are adapted to be moved into engagement with an object, such as a substantially flat object or panel or the like, and to lift and move the object to a desired location. The vacuum lifters cups may be moved into engagement with the object, and the vacuum generator may be actuated to create a vacuum between the object and a suction cup such that the object is retained to the suction lifter as it is transported to the desired location. Such material handling systems may be a part of one or more working stations.

Herein, "vacuum systems" is referred to as vacuum systems for transporting objects.

The vacuum generated at the vacuum lifters is provided by the vacuum generator arrangement in the vacuum system, whereby pressurized air is supplied or provided to the vacuum generator of the arrangement.

When the air supply to the vacuum generator is deactivated, such that no vacuum is generated, the vacuum in the vacuum system typically dissipate through a vent that connects the vacuum system to an atmosphere outside of the system, and when the vacuum has dissipated in the system and in the suction cup, to a sufficient amount, the suction cup may be released from the object.

When using a vacuum lifter, the air consumption is an important factor to consider. For the lifter to be a good solution for automation applications, the consumption needs to be reduced to a minimum. For non-leaking materials, using vacuum and vacuum lifters is an effective method for lifting objects. Herein, this can be called a "vacuum lifting process". When the required vacuum level has been reached, the system can be turned off without having the vacuum level reduced. However, when handling leaking objects, the air consumption can be a concern.

Therefore, typically the vacuum used for leaking applications is over-dimensioned in proportion to the required level.

In today's industry, the lifting process can somewhat be dynamically controlled. The way it is done is that the system creates the required vacuum level and then turns off. When the level has decreased to a minimum value, the vacuum system will turn on again. This approach however does not take into consideration the different lifting stages.

However, according to our best knowledge, solutions that solve this problem in a satisfactory way have not been found.

The object of the present invention is to achieve an improved vacuum system and method in such a system that eliminates, or at least mitigates, the above stated drawbacks.

SUMMARY

Vacuum systems for transporting objects involve one or more vents, typically valves for activating vacuum generation in a vacuum gripper. Such a vent is typically electrically opened, e.g. by solenoid, for letting air through the vacuum generator to generate vacuum pressure in the vacuum gripper. Typically, the vacuum system is mechanically closed e.g. by a spring device or magnet, letting no air through to the vacuum generator when at least a preset vacuum pressure is achieved and/or no vacuum pressure should be generated. When the vent is closed, no electric power, or at least no essentially power, is consumed by the vent. The vacuum system may therefore typically involve an Energy Saving (ES) function for saving energy by not powering vents of the vacuum system. Typically, control signals are used by a method and the vacuum system, typically a vacuum system controller of the vacuum system for controlling the Energy Saving (ES) function. Said ES function makes use of vacuum pressure level settings defining a pressure interval wherein vacuum generation is only active when a minimum pressure level is detected and it is necessary to increase vacuum pressure up to a preset maximum pressure level where the vacuum generation is stopped.

By creating a dynamically controlled system that can change the vacuum level dynamically, the compressed air consumption can some-what be reduced, but not during the entire lifting process.

A solution that solves this problem in a satisfactory way has not been found. Some products could be used for dynamical control, however, these products typically use solenoid valves. The problem is that the lifespan of the solenoid valves would be very low, typically due to overheating from the heavy usage.

This approach however does not take into consideration different lifting stages of a complete lifting process and typically moreover the solenoid valves have very low lifespan in this context.

One object of the present invention is to provide a vacuum system, a method of a vacuum system, for controlling a vacuum generator arrangement and valve in such a vacuum system that eliminates, or at least mitigates, the above stated drawbacks: at least taking into consideration of the different lifting stages during the entire lifting process and preferably in addition to that also increase the life span of the valves.

Depending on the stage of the lifting process, the required vacuum level of the vacuum system, and in particular of the vacuum lifter, will vary. For example, when the object is accelerated upwards a higher level is needed compared to when the object is lowered. Due to that the object being lifted, the air consumption might be reduced by dynamically adjusting the required vacuum level during the complete lifting process.

The above-mentioned object is achieved by the present invention according to the aspects and embodiments of the independent claims. Preferred embodiments are set forth in the dependent claims.

According to an embodiment, there is provided a method for automatic pressure level adaptation enabling energy saving in a lifting process in a vacuum system operating a vacuum lifter for transportation of objects. The vacuum system comprises a vacuum generator arrangement driven by a compressed air flow. The vacuum generator arrangement via a vacuum chamber being part of the vacuum system is arranged to be brought in flow connection with the vacuum lifter, in order to supply vacuum to the vacuum lifter in result of the compressed air flow. A pressure sensor for monitoring a system-pressure is arranged inside the vacuum chamber. Possibly a vacuum system controller of the vacuum system is electrically connected to a main controller. The vacuum system controller is arranged to control and communicate with the vacuum generator arrangement and communicate with the pressure sensor. The vacuum system controller is arranged to monitor the measured system-pressure over a number of monitored points. A required vacuum level is adjusted during a complete lifting process required to hold on to the object for each monitored point during the complete lifting process.

In this disclosure a "complete lifting process" is defined as:

According to first embodiment comprising the first aspect, there is further determined a reference signal at start-up. This means that the applied vacuum will vary during the lifting process; wherein the supplied compressed air can be reduced, and in particular if the reference signal $S_{ref}$ is well determined.

According to another embodiment, there is provided a system for automatic pressure level adaptation enabling energy saving in a lifting process in a vacuum system operating a vacuum lifter for transportation of objects. The vacuum system comprises a vacuum generator arrangement driven by a compressed air flow, wherein the vacuum generator arrangement via a vacuum chamber being part of the vacuum system is arranged to be brought in flow connection with the vacuum lifter, in order to supply vacuum to the vacuum lifter in result of the compressed air flow. The pressure sensor for monitoring a system-pressure is arranged inside the vacuum chamber; and a vacuum system controller possibly being electrically connected to a main controller. The vacuum system controller is arranged to control and communicate with the vacuum generator arrangement and communicate with the pressure sensor, and the vacuum system controller is arranged to monitor the measured system-pressure over a number of monitored points. The vacuum system controller of the vacuum system is further arranged to adjust a required vacuum level during a complete lifting process required to hold on to the object for each monitored point during the lifting process.

According to another embodiment the vacuum system controller of the vacuum system is further arranged to adjust a required vacuum level during a complete lifting process by means of a valve that does not wear considerably in this context. The input air pressure to the ejector is adjusted using a needle valve. The needle can be rotated due to its threads and the threaded valve body. A seal such as an O-ring seals the needle from the threads to minimize air leakage. When closing the valve, the needle goes against a part made of polyoxymethylene (POM). This part has a drilled hole in its center. The POM can be screwed into place in the valve. The size of the hole can be adjusted for the wanted characteristics of the system by changing the POM.

The invention, according to the various aspects and embodiments, solves the problem, which is frequently encountered in, but not limited to, applications with working stations and ergonomic vacuum lifters having a gripper with suction cups and equipped with energy saving possibilities.

SHORT DESCRIPTION OF THE DRAWINGS

The invention is explained more in detail below with reference made to the accompanying drawing, wherein embodiments of the invention are illustrated schematically:

DETAILED DESCRIPTION OF THE INVENTION

Vacuum systems for transporting objects are known per se and involve one or more vents, typically valves for activating vacuum generation in a vacuum lifter. Such a vent is typically electrically opened, e.g. by solenoid, for letting air through the vacuum generator to generate vacuum pressure in the vacuum gripper. Typically, the vacuum system is mechanically closed e.g. by a spring device or magnet, letting no air through to the vacuum generator when at least a preset vacuum pressure is achieved and/or no vacuum pressure should be generated. When the vent is closed, no electric power, or at least no essentially power, is consumed by the vent. The vacuum system may therefore typically involve an Energy Saving (ES) function for saving energy by not powering vents of the vacuum system. Typically, dynamical control signals are used by a method and the vacuum system, typically a vacuum system controller of the vacuum system for controlling the Energy Saving (ES) function. Said ES function makes use of vacuum pressure level settings defining a pressure interval wherein vacuum generation is only active when a minimum pressure level is detected and it is necessary to increase vacuum pressure up to a preset maximum pressure level where the vacuum generation is stopped.

By creating a dynamically controlled system that can change the vacuum level dynamically, the compressed air consumption can somewhat be reduced.

Figure 1:
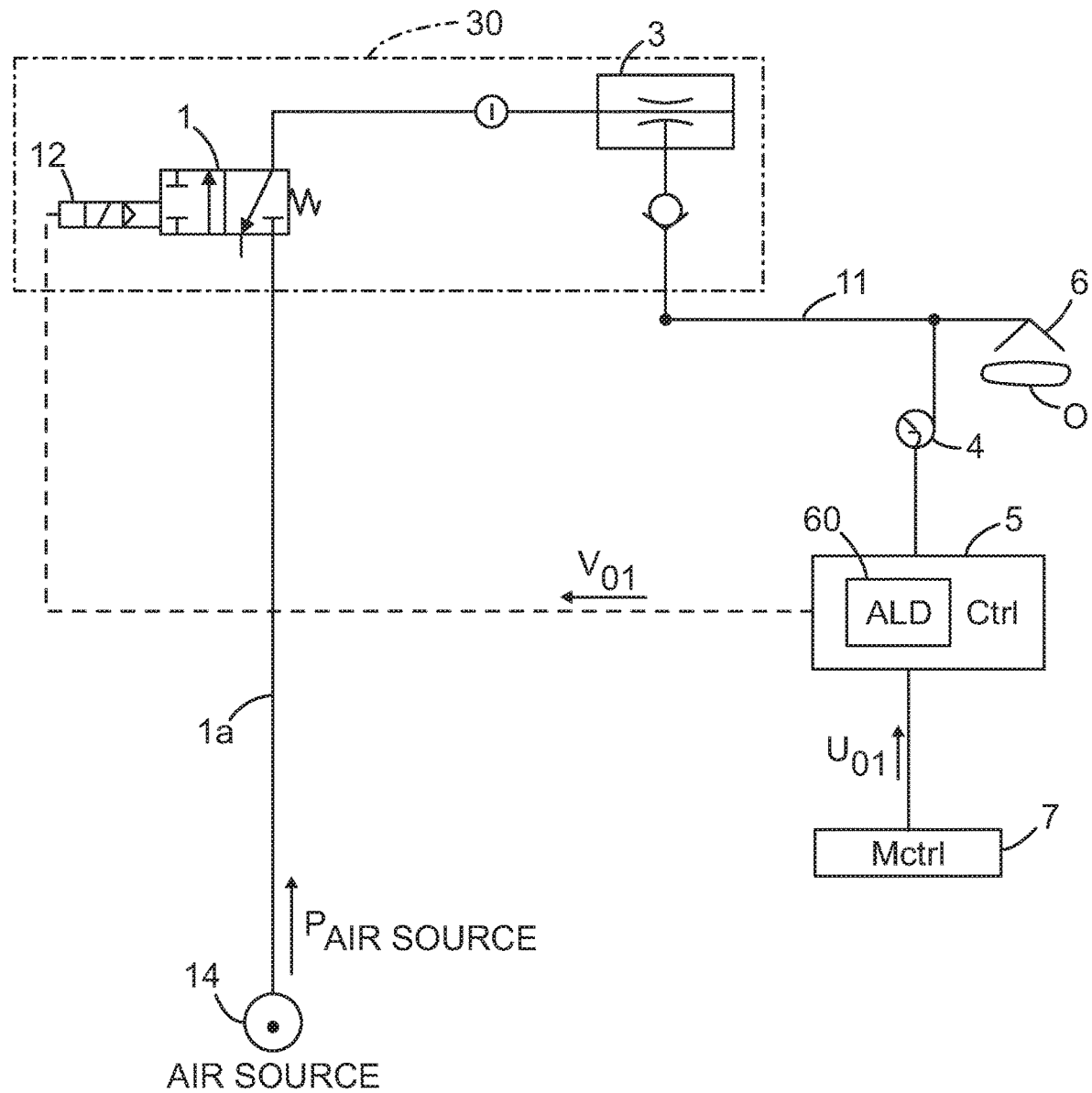
FIG. 1 is a block diagram illustrating a schematic view of a vacuum system 10 according to an embodiment of the invention.

For a description of implementation of a vacuum system 10 for transportation of objects, reference is initially made to FIG. 1 illustrating an embodiment of the invention.

Herein the term "vacuum lifter" also comprises "vacuum gripper" or "vacuum gripper tool" and may be alternately used, but the two terms refers to the same kind vacuum lifters, which also may include a plurality of vacuum lifters.

The vacuum system 10 comprises a vacuum generator 3 driven by a compressed air flow via a vent, herein an on/off valve, 1, or other means for controlling the compressed air flow, wherein the vacuum generator 3 via a vacuum chamber 11 being part of the vacuum system 10 is arranged to be brought in flow connection with one or more vacuum lifters 6 comprised in the vacuum system 10, in order to supply vacuum to the vacuum gripper 6 in result of the compressed air flow to the vacuum generator 3. In FIG. 1, the line $P_{air\ source}$ represents the direction of compressed air flow from a compressed air supply source AIR SOURCE via the on/off valve 1 to the vacuum generator 3. The air supply source AIR SOURCE is typically the source for supplying compressed air to the vacuum generator 3, in other words to the on/off valve 1, for allowing compressed air into the vacuum system 10, typically inside a vacuum chamber 11, via supply connection 1a as illustrated in FIG. 1.

A pressure sensor 4 is provided inside, or at, or centrally located to, the vacuum chamber 11 for monitoring a system-pressure $p^-$. The vacuum system 10 further comprises a vacuum system controller 5, in short also referred to as a "controller". As an example, but without any limitation thereto, the on/off valve 1 can either be a directly operated solenoid-valve, or operating as a pilot-valve to actuate piloted valves to supply the vacuum generator 3 and/or vacuum system 10 with air.

Typically, the controller 5 is arranged to communicate with the on/off valve 1 via signaling $V_{01}$, and the pressure sensor 4. The vacuum system 10, and/or the vacuum generator 3 can be integrated with the controller 5 and the on/off 1, as well as the system-pressure sensor 4 (the latter sometimes also referred to as a pressure gauge), of which the latter can be used to monitor the system-pressure $P=p^-$ in the vacuum system 10, in particular in the vacuum chamber 11. The controller 5 can alternatively be monitored and controlled by, and/or communicating with, a main controller 7 via signaling $U_{01}$, which is the vacuum control signal to controller 5 from main controller. The signal $V_{01}$ is the internal vacuum control signal to the on/off valve 1. The values of the signals $U_{01}$ and $V_{01}$ may be binary, e.g. either "1" or "0", i.e. "one" or "zero". Signal levels "1" and "0", respectively, may be interpreted as "true" or "false". Thus, if "1" is set to "true" than "0" is set to "false", or if "1" corresponds to "false" than "0" corresponds to "true". Further, signal value "1" may be characterized as "high" and signal value "0" may be characterized as "low". In addition, other values than "1" and "0" may be used, e.g. "1" and "−1", "0" and "−1", etc.

If, for example, signal $U_{01}$ is "high" from main controller 7 to controller 5, this means that the vacuum lifter 6 should be activated for attaching by suction to an object to be lifted. If, on the contrary, signal $U_{01}$ is "low" from main controller 7 to controller 5, this means that the gripper tool 6 should be deactivated for releasing the object to which the vacuum gripper tool is attacked. Thus, the main controller 7 controls the attachment or release of the vacuum lifter to an object via the controller 5. The controller 5 essentially controls the on/off valve 1, but possibly also vacuum generator 3, and possibly also other parts of the vacuum system 10.

Typically, the controller 5 may be defined and/or operated by components including a specific control-algorithm implemented in an existing controller used for controlling the on/off valve 1, and vacuum generator 3, but also other parts of the vacuum system 10. According to an aspect, the present disclosure builds on the idea that in the vacuum system 10, the required vacuum level for lifting an object O will vary during a lifting process $W_c$. For high accelerations when moving the object O upwards, a higher (typically a lower pressure $P^-$) vacuum level $P^-$ is required compared to the vacuum level $P^-$ of the object O standing still or moving downwards.

As is understood by the description of FIG. 1, a working cycle Wc starts when the vacuum lifter has been applied to the object, and it ends when the object has been released.

When a new working cycle Wc for the vacuum gripper tool starts, the controller activates the vacuum generation and the system system-pressure $P=p^-$ rises from null, "0", up to system-pressure $P=p_n^-$ at the time t1. The vacuum generation stops by the controller 5 closing the on/off valve 1 at system-pressure $P=p_n^-$ resulting in that the air flow from the air source through the first on/off valve is shut off. The system-pressure $P=p^-$ will sink due to leakage in the system, especially in the vacuum lifter. When the system-pressure has sunken to $p^-=ES_{Low}$ the on/off valve 1 is opened by the controller 5 and the system-pressure $p^-$ generation in the vacuum chamber 11 starts and rises to $p^-=ES_{High}$ where the vacuum generation stops by shutting the air flow $P_{air\ source}$ from the air source air source 1a through the on/off valve 1 off. The leakage in the system 10 and the vacuum lifter 6 will again result in the sink of the system-pressure $p^-$ when the system-pressure has sunken to $p^-=ES_{Low}$ the on/off valve 1 is opened again by the controller and the system-pressure $p^-$ generation in the vacuum chamber 11 starts and rises to $p^-=ES_{High}$ where the vacuum generation stops by shutting the air flow through the on/off valve 1 from the air source to the vacuum generator off 3. This repetition process comprising to let the system-pressure $p^-$ sink to $p^-=ES_{Low}$ and to start the system-pressure $p^-$ generation in the vacuum chamber 11 to rise the system-pressure $p^-=ES_{High}$ is repeated until the controller sends a release control signal for releasing the vacuum lifter 6 from the transported object O. The release control signal makes the system-pressurep to sink to null, "0", by letting air (not shown explicitly) into the vacuum lifter 6. When the vacuum lifter 6 has released the object O at the end of the transportation path (Wc) of a working station, the controller 5 or possibly the main controller 7 guides the vacuum lifter 6 back to the beginning, or start, of the transportation path. A new working cycles $W_c$ for the vacuum lifter 6 starts.

The pressure sensor 4 transduces measured vacuum pressure $p^-$ to electrical signals which values are dependent of the measured system-pressure $p^-$.

Typically, the vacuum system controller 5 is arranged to measure an acceleration $O_{acc}$ of the object being moved by the vacuum lifter 6. The vacuum system 10 takes the acceleration $O_{acc}$ of the object into consideration and calculates the required vacuum $P^-$ from some different data variables.

The acceleration and mass of the object O together gives a force required to hold on to the object O during the entire lifting process $W_c$. Force characteristics then give a connection between this force and the required vacuum $P^-$. The result is an array of vacuum values that gives the minimum amount of vacuum $P^-$ required to hold onto the object O.

Figure 2:
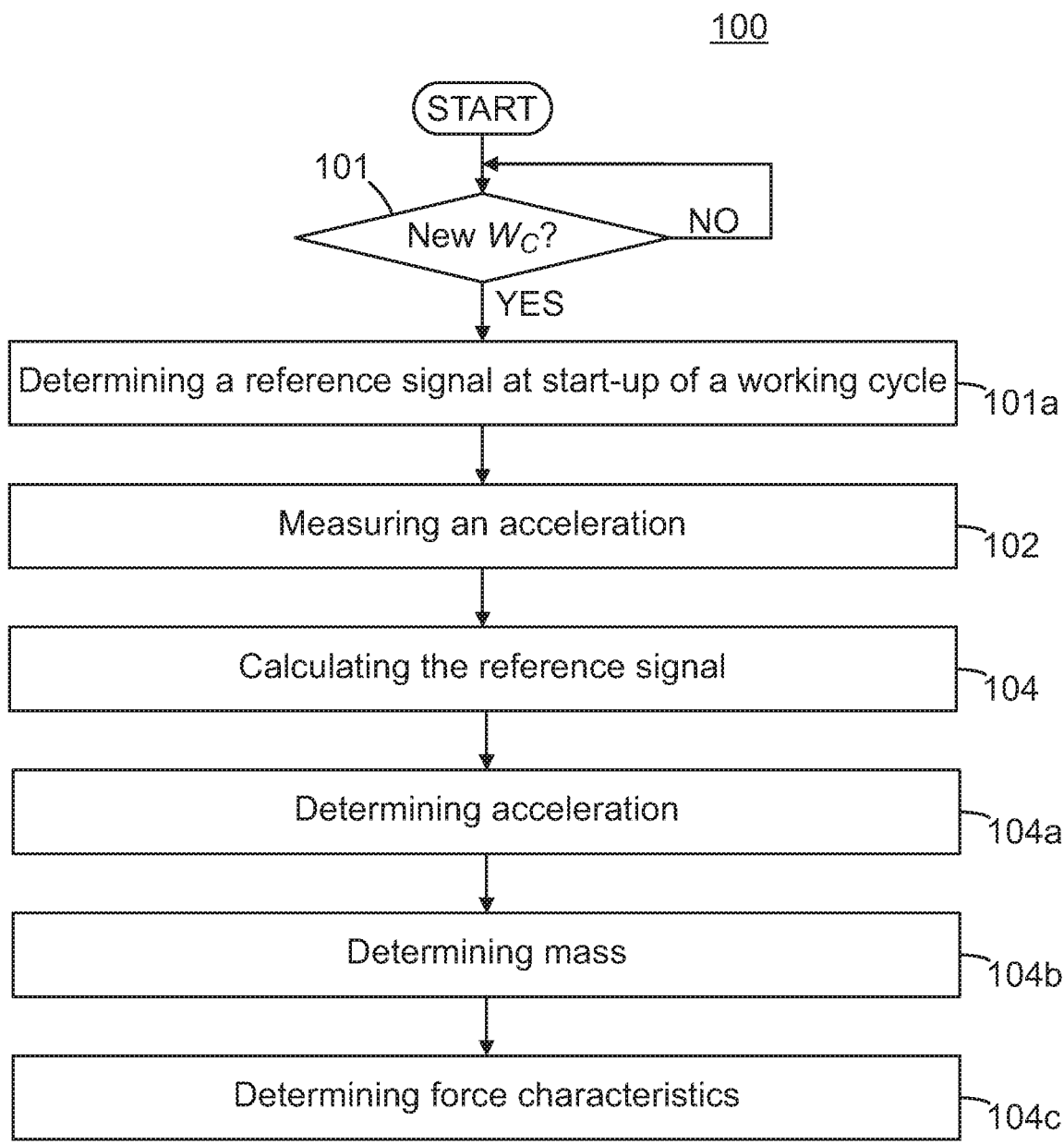
FIG. 2 is a flowchart of a method for according to the invention.

Now is also referred to FIG. 2 illustrating a method 100 according to one embodiment. The method comprises the vacuum system 10, and in particular the vacuum system controller 5 being arranged to control and communicate with the vacuum generator arrangement 1 and communicate with the pressure sensor 4, and wherein the vacuum system controller 5 is arranged to monitor the measured system-pressure $P^-t$ over time and a number of monitored points. The method 100 comprises adjusting 101 a required vacuum level $P^-$ during a complete lifting process $W_c$ required to hold on to the object O for each monitored point $P_{mon}$ during the lifting process W.

Typically, at start-up of a new 100a working process $W_c$, a reference signal $S_{ref}$ is determined 100b.

Typically, the method 100 comprises one or more of the steps of:

measuring 102 an acceleration of the object being moved by the vacuum lifter 6;

calculating 104 a reference signal $Sr_ef$, wherein the reference signal $S_{ref}$ is calculated vacuum levels $P^-$, wherein these vacuum levels $P^-$ are the minimum vacuum levels required to hold on to the object O for each monitored point $P_{mon}$ during the entire lifting process $W_c$.

Typically, the calculation 104 of the reference signal is using 104 three variables: acceleration Object$_{acc}$, mass of object $O_{mass}$ and the force characteristics $O_{force\ char}$ for a specific lifter pad being used for the vacuum lifter 6. The lifter pad is typically a vacuum lifter pad but since this type of lifter pad per se is well known within vacuum lifting technology the lifter pad is not shown or described in more detail herein this disclosure.

Typically the force characteristics $O_{force\ char}$ are calculated 102 by gathering data of the connection between vacuum level (P) and force $O_{force}$.

Typically the force and force characteristics $O_{force\ char}$ is calculated 102 using a dynamometer in a set up where the object O can be pulled away from the vacuum pad of the vacuum lifter 6.

Typically the force and force characteristics $O_{force}$ is calculated 102, such that when the vacuum pad of the vacuum lifter 6 loses its grip for a specific vacuum level P⁻, this is the maximum force $O_{force}$ that the vacuum lifter 6, in particular the lifter pad, can apply to the lifting of the object O.

According to another aspect in addition to the above aspect is that an additional problem even though some products could be used for dynamical control to some extent even though not the entire lifting process, these products use solenoid valves. The problem is that the lifespan of the solenoid valves would be very low due to overheating from the heavy usage. The problem is that the lifespan of the solenoid valves would be very low due to overheating from the heavy usage.

Figure 3:
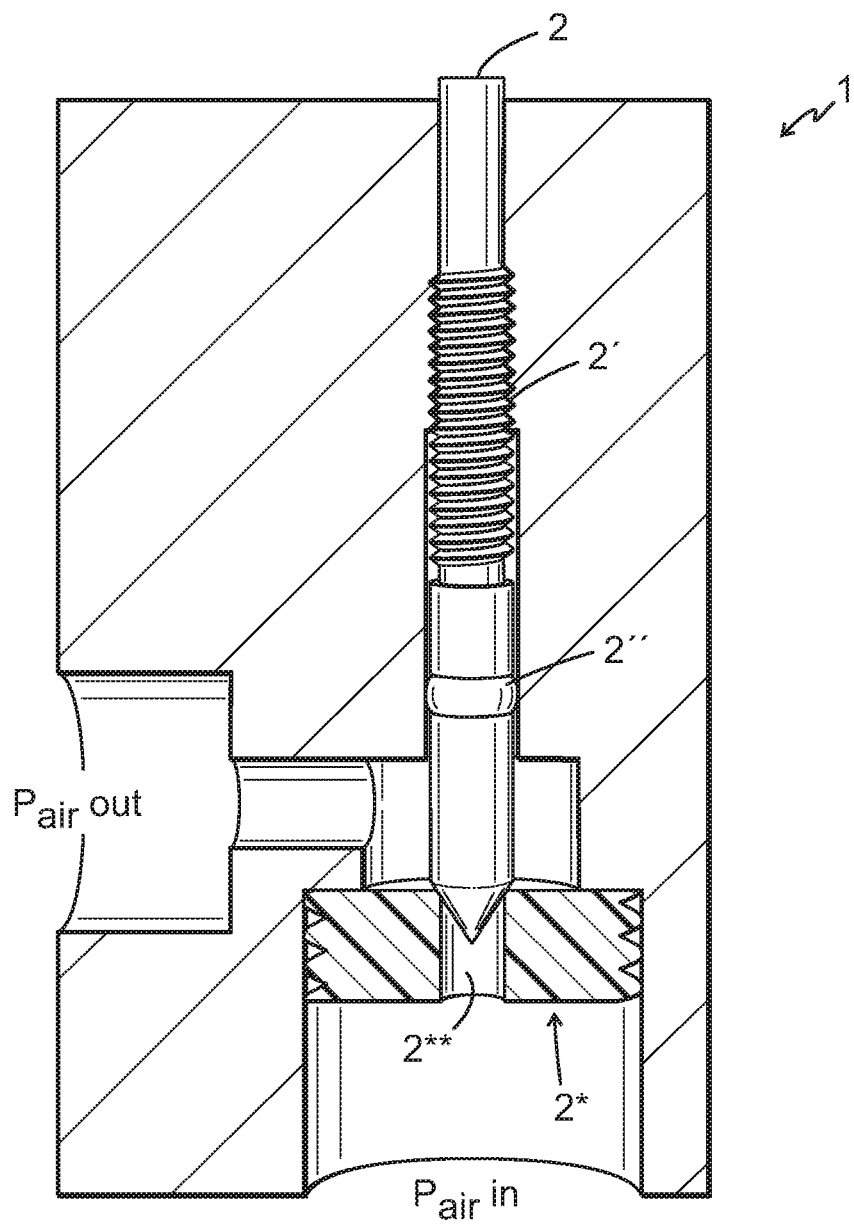
FIG. 3 is a valve embodied as a needle valve according to an embodiment of the present invention.

Now is referred to FIG. 3, which illustrates a vent 1 according to an embodiment of the present invention.

According to another embodiment the vacuum system controller 5 in the system 10 is further arranged to adjust a required vacuum level during a complete lifting process by means of a vent 1 embodied as a needle valve. Thus, in this particular embodiment, the input air pressure P⁻ to the ejector 3 is adjusted using a vent 1 embodied as a needle valve.

FIG. 3 illustrates a vent 1 embodied as a needle valve 1. The needle valve 1 comprises a needle 2 having threads 2' that can be rotated into a housing having corresponding threads (not shown in this FIG. 3 because of simplicity) due to its threads 2' and the housing (not shown) of the threaded needle valve 1. An O-ring 2'' seals the needle 2 from the threads 2''' to minimize air leakage. When closing the valve 1, the needle 2 goes against a valve seat 2*. The valve seat 2* can for instance made of Polyoxymethylene (POM). This valve seat 2* has a drilled hole in 2 its center. As an example, the POM can be screwed into place in the valve 1. The size of the hole 2**** can be adjusted for the wanted characteristics of the system by changing the POM.

This valve 1 is typically driven by a stepper motor 12 connected to the controller 5, 7, which allows for controlling the position $P_{valve}$ of the valve 1 precisely. This controller 5, 7 is typically a microcontroller 5, 7 that measures the vacuum level from the ejector 3 using a vacuum sensor 4 that is already integrated. The controller 5, 7 creates a closed loop system with the stepper motor 12 and valve 1. The set point for the control system 5 can then be set to the desired vacuum level V− and the vacuum system 10 should be able to achieve that level.

The controller 5 may be defined and/or operated by components including a specific control-algorithm implemented in an existing controller used for controlling the on/off valve 1 of the vacuum generator arrangement 30, but also other parts of the vacuum system.

The controller 5 indicates a state of no vacuum generation, for instance by a signal $V_{01}$ to the vacuum generator per se, or the on/off valve 1 of the vacuum generator arrangement 3.

The method enables energy saving in during the working cycles in a vacuum system comprising and operating a vacuum generator arrangement. Such systems are described both in FIG. 1. The method may be implemented as executable computer program instructions in computer program software, or as hardware. Said computer program software will cause a programmable logic computer to perform the steps of the method when run in and by a programmable logic computer, PLC. The above described vacuum system controller (5 in FIG. 1) is a programmable logic computer. The method may be carried out by the vacuum system controller, or another PLC that is able to communicate with said controller constituting vacuum system controller arrangement. The vacuum system controller is arranged to control and communicate with the vacuum generator arrangement and with a pressure sensor for measuring system-pressure $P=p^-(t)=p^-$. The controller is arranged to monitor the measured system-pressure $p^-$ continuously. The controller is further capable to calculate the system-pressure time derivative $D(t)=dp^-/dt$ during working cycles.

Other advantages compared to prior art is no waste and/or easy to use. Since typically, but without limitation thereto, only one system-pressure sensor 4 is used, there is no need for additional sensors and external functions. No sensors are needed on each vacuum lifter 6, for example suction cup, but only one centrally located, or centralized sensor as described above.

It is an advantage to locate the method in the vacuum system controller 5 and not in the main controller 7. Said controllers 5, 7 are communicating with each other via bus wirings, e.g. cables. Said wiring often introduces delay due to the length of the wiring. Such a delay may be of substantial significance causing disturbance of the control and operation of the vacuum system. If the ADL function and method is located in the vacuum system controller, which is closer to the vacuum system than the main controller, said delay is eliminated.

The controller 5 or the inventive method requires no manual intervention or setting in order to be used. This is an advantage compared to prior art device often requiring intensive manual labor by the operator, or the operator setting control parameters having unnecessary long time periods to ensure proper venting to atmosphere.

An advantage with this embodiment is that, since the method 100 and vacuum system controller is continuously adapting, and is only activated for as often and as long as necessary dictated by the actual need of the application.

But, according to an alternative embodiment, or in addition, the vacuum system controller 5 can be adapted so that the operator may also manually adjust the control parameters to better fit individual needs of an application or use.

The vacuum system-pressure $p^-(t)$ can be monitored continuously or periodically and fluctuation can be detected autonomously.

The schematically illustrated vacuum generator 3 in FIG. 1 is typically realized as an ejector.

The vacuum lifter 6 may be realized as a suction cup, or as a set of suction cups that are commonly supplied from the vacuum generator 3.

It shall be noted that FIG. 1 merely depicts the general layout of a vacuum system for the purpose of illustrating the invention, and that a vacuum system in practice can comprise additional valves, sensors and flow connections in order to adapt the vacuum system to a desired functionality, as would be known to a person skilled in the art.

The invention is defined in the accompanying claims, encompassing the above and other modifications of the invention which may be appreciated by the skilled person from the teachings provided above.

As an example, the components that define and/or operate the vacuum system controller in this example may be implemented by special-purpose software (or firmware) run on one or more general-purpose or special-purpose computing devices. Such a computing device may include one or more processing units, e.g. a CPU ("Central Processing Unit"), a DSP ("Digital Signal Processor"), an ASIC ("Application-Specific Integrated Circuit"), discrete analogue and/or digital components, or some other programmable logical device, such as an FPGA ("Field Programmable Gate Array"). In this context, it is to be understood that each "component" of the controller 5 refers to a conceptual equivalent of an algorithm; there is not always a one-to-one correspondence between components and particular pieces of hardware or software routines. One piece of hardware sometimes comprises different components. For example, the processing unit may serve as one component when executing one instruction, but serve as another component when executing another instruction. In addition, one component may be implemented by one instruction in some cases, but by a plurality of instructions in some other cases. The computing device may further include a system memory and a system bus that couples various system components including the system memory to the processing unit. The system bus may be any of several types of bus structures including a memory bus or memory controller, a peripheral bus, and a local bus using any of a variety of bus architectures. The system memory may include computer storage media in the form of volatile and/or non-volatile memory such as read only memory (ROM), random access memory (RAM) and flash memory. The special-purpose software may be stored in the system memory, or on other removable/non-removable volatile/non-volatile computer storage media which is included in or accessible to the computing device, such as magnetic media, optical media, flash memory cards, digital tape, solid state RAM, solid state ROM, etc. The computing device may include one or more communication interfaces, such as a serial interface, a parallel interface, a USB interface, a wireless interface, a network adapter, etc. One or more I/O devices may be connected to the computing device, via a communication interface, including e.g. a keyboard, a mouse, a touch screen, a display, a printer, a disk drive, etc. The special-purpose software may be provided to the computing device on any suitable computer-readable medium, including a record medium, a read-only memory, or an electrical carrier signal.

Typically, all the functions to operate the controller 5 and method 100 are included in one compact package such as piCompact.

The invention claimed is:

1. A method for automatic pressure level adaptation enabling energy saving in a lifting process (Wc) in a vacuum system operating a vacuum lifter for transportation of objects (O), said vacuum system comprises a vacuum generator arrangement driven by a compressed air flow (P), wherein the vacuum generator arrangement via a vacuum chamber being part of the vacuum system is arranged to be brought in flow connection with the vacuum lifter, in order to supply vacuum to the vacuum lifter in result of the compressed air flow (P), wherein a pressure sensor for monitoring a system-pressure $\hat{p}^-(t)$ over time is arranged inside the vacuum chamber; and a vacuum system controller possibly being electrically connected to a main controller, wherein the vacuum system controller is arranged to control and communicate with the vacuum generator arrangement and communicate with the pressure sensor, and the vacuum system controller is arranged to monitor the measured system-pressure $\hat{p}^-(t)$ over a number of monitored points, wherein adjusting a required vacuum level (P-) during a complete lifting process (Wc) required to hold on to the object (O) for each monitored point (Pmon) during the complete lifting process (Wc), wherein the method comprises the step of:

measuring an acceleration ($O_{acc}$) of the object being moved by the vacuum lifter.

2. The method for automatic pressure level adaptation of claim 1, wherein the method comprises the step of:

determining (100*b*) at start-up of the lifting process ($W_c$) the reference signal ($S_{ref}$).

3. The method for automatic pressure level adaptation of claim 1, wherein the method comprises the step of:

calculating a reference signal ($S_{ref}$), wherein the reference signal ($S_{ref}$) is calculated vacuum levels (p⁻), wherein these levels (p⁻) are the minimum vacuum level required to hold on to the object (O) for each monitored point ($P_{mon}$) during the entire lifting process ($W_c$).

4. The method according to claim 3, wherein calculating the reference signal uses three variables: acceleration (Object$_{acc}$), mass of object ($O_{mass}$) and the force characteristics ($O_{force\ char}$) for a specific vacuum pad being used for the vacuum lifter.

5. The method according to claim 1, wherein the force characteristics ($O_{force\ char}$) are calculated (104*c*) by gathering data of the connection between vacuum level (P⁻) and force ($O_{force}$).

6. The method according to claim 5, wherein the force is calculated using a dynamometer in a set up where the object (O) can be pulled away from the vacuum pad.

7. The method according to claim 6, wherein the force is calculated, such that when the pad loses its grip for a specific vacuum level, this is the maximum force ($O_{force}$) that the vacuum lifter, in particular a lifter pad, can apply to the lifting of the object (O).

8. The method according to claim 1, wherein system-pressure p⁻(t) is monitored continuously over time.

9. The method according to claim 1, wherein system-pressure p⁻(t) is monitored periodically over time.

10. A system for automatic pressure level adaptation enabling energy saving in a lifting process ($W_c$) in a vacuum system operating a vacuum lifter for transportation of objects (O), said vacuum system comprises a vacuum generator arrangement driven by a compressed air flow (P), wherein the vacuum generator arrangement via a vacuum chamber being part of the vacuum system is arranged to be brought in flow connection with the vacuum lifter, in order to supply vacuum to the vacuum lifter in result of the compressed air flow (P), wherein a pressure sensor for monitoring a system-pressure p⁻(t) is arranged inside the vacuum chamber; and a vacuum system controller possibly being electrically connected to a main controller, wherein the vacuum system controller is arranged to control and communicate with the vacuum generator arrangement and communicate with the pressure sensor, and the vacuum system controller is arranged to monitor the measured system-pressure p⁻(t) over a number of monitored points, wherein the controller is arranged to adjust a required vacuum level (P⁻) during a complete lifting process ($W_c$) required to hold on to the object (O) for each monitored point ($P_{mon}$) during the lifting process ($W_c$), wherein the vacuum system controller is arranged to measure an acceleration ($O_{acc}$) of the object being moved by the vacuum lifter.

11. The system according to claim 10, wherein the vacuum system controller is arranged to calculate a reference signal ($S_{ref}$), wherein the reference signal ($S_{ref}$) is calculated vacuum levels ($p^-$), wherein these levels ($p^-$) are the minimum vacuum level required to hold on to the object (O) for each monitored point ($P_{mon}$) during the lifting process ($W_c$).

12. The system according to claim 10, wherein system-pressure $p^-(t)$ is monitored continuously and fluctuation is detected autonomously.

13. The system according to claim 10, wherein system-pressure $p^-(t)$ is monitored periodically and fluctuation is detected autonomously.

14. The system according to claim 10, further comprising a vent, wherein the vent comprises a needle valve.

\* \* \* \* \*